(12) United States Patent
Gallant et al.

(10) Patent No.: US 7,632,433 B1
(45) Date of Patent: Dec. 15, 2009

(54) PROCESS FOR MAKING GRADIENT MATERIALS

(76) Inventors: Frederick Mitchell Gallant, 11640 Cygnet Dr., Waldorf, MD (US) 20601; Hugh Alan Bruck, 111 Claybrook Dr., Wheaton, MD (US) 20902; David I. Bigio, 4856 Sweetbirch Dr., Rockville, MD (US) 20853

( * ) Notice: Subject to any disclaimer, the term of this patent is extended or adjusted under 35 U.S.C. 154(b) by 477 days.

(21) Appl. No.: 10/807,582

(22) Filed: Mar. 23, 2004

(51) Int. Cl.
*B29C 47/92* (2006.01)
(52) U.S. Cl. ........................ 264/3.3; 264/40.7
(58) Field of Classification Search ............ 264/211.23, 264/40.7, 3.3
See application file for complete search history.

(56) References Cited

U.S. PATENT DOCUMENTS 3,388,196 A * 6/1968 Farrell ......................... 264/75
3,906,065 A * 9/1975 Schneider et al. ........... 264/40.1
4,110,394 A * 8/1978 Shimada et al. ............. 264/167
4,550,002 A * 10/1985 Uhland et al. ............... 264/40.1
4,608,210 A * 8/1986 Muller et al. ................ 264/3.2
5,158,725 A * 10/1992 Handa et al. ................ 264/40.7
7,063,810 B1 * 6/2006 Murphy et al. .............. 264/3.3

FOREIGN PATENT DOCUMENTS

WO          00/20190      * 4/2000

* cited by examiner

*Primary Examiner*—Jill L Heitbrink
(74) *Attorney, Agent, or Firm*—Fredric Zimmerman

(57) ABSTRACT

The present invention is a process for making a gradient material using a screw extruder system having material input conditions, operating conditions, and hardware element configurations and introducing disturbances into at least one of the material input conditions, operating conditions, or hardware element configurations so that a gradient material is formed by the screw extruder system.

7 Claims, 2 Drawing Sheets

*Twin-screw extrusion process used to fabricate continuously graded particle-reinforced polymer composites.*

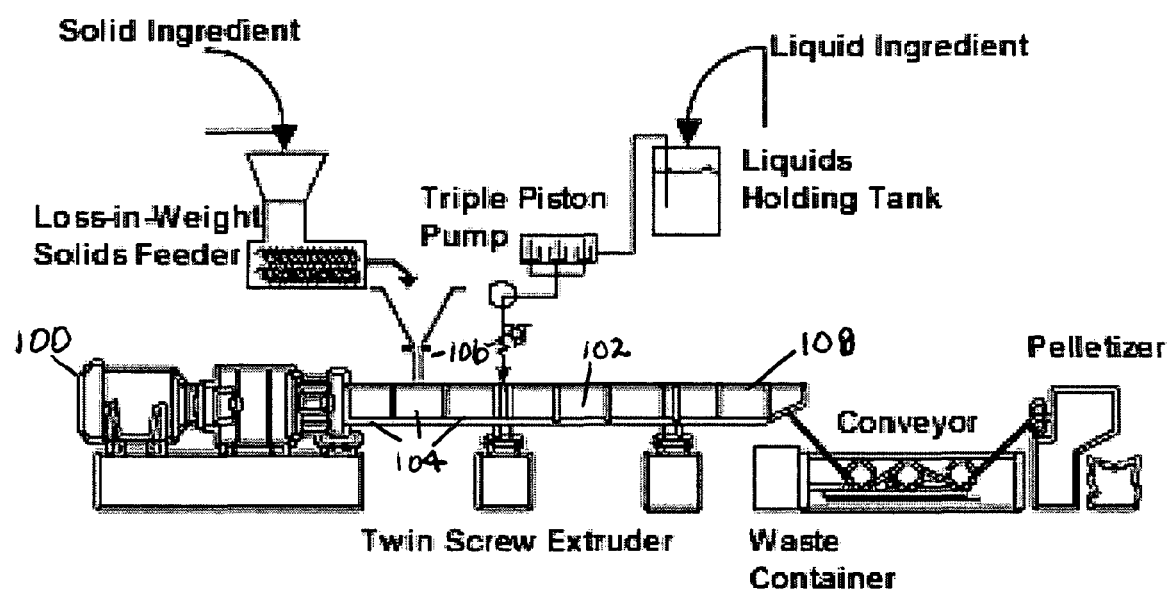
Figure 1. Twin-screw extrusion process used to fabricate continuously graded particle-reinforced polymer composites.

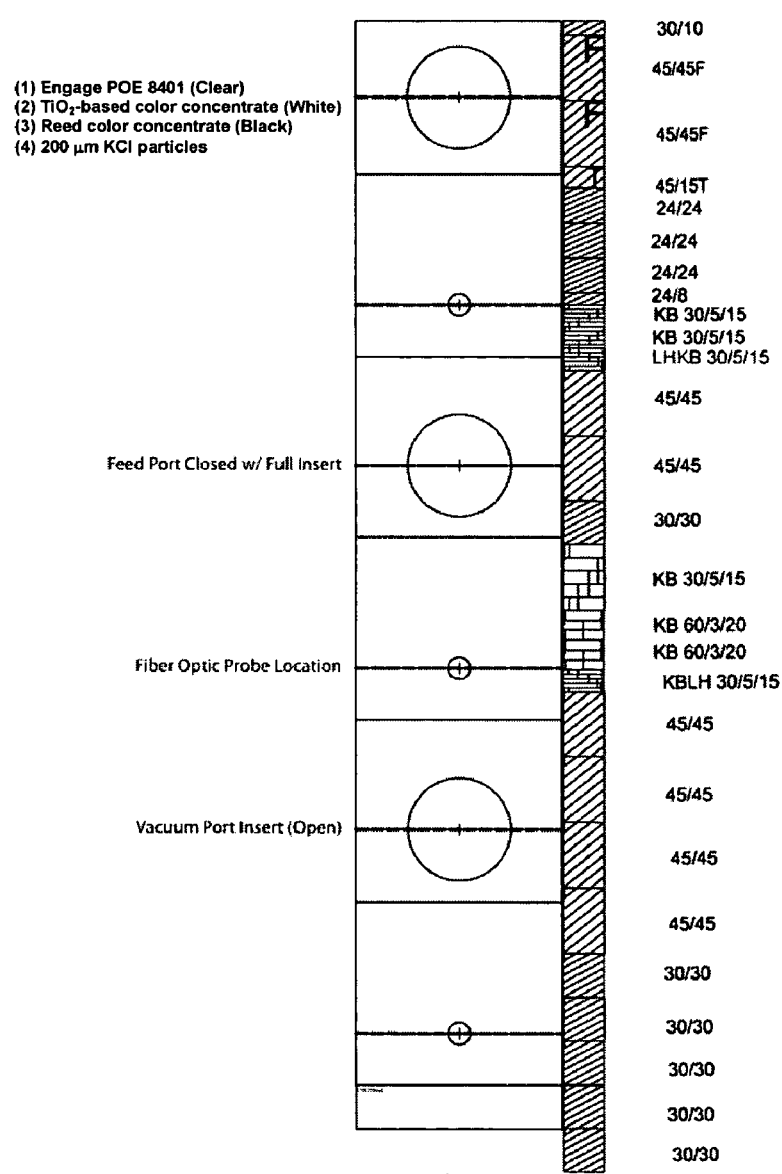
Figure 2. Screw configuration, feed locations, and probe locations used for the 28 mm TSE experiments.

US 7,632,433 B1

PROCESS FOR MAKING GRADIENT MATERIALS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates, in general, to a process for making gradient materials, more particularly, to a process for making gradient propellant materials, and most particularly, to a process for making gradient propellant materials using a twin-screw extrusion process.

2. Description of the Related Art

There is a great deal of interest in tailoring structures so the functional requirements can vary with location. In most cases, this will involve varying the materials that are used at specific locations within the structure resulting in discrete interfaces throughout. These discrete interfaces are often weaker than the surrounding materials and also act as stress concentrators, a dangerous combination that can lead to structural failure. Attempts at reducing stress concentrations and increasing the fracture toughness of interfaces have led to the concept of Functionally Graded Materials (FGMs). FGMs are structures that possess gradual variations in material behavior that enhance material and/or structural performance.

For example, at one point the material may be hard and at another point it may be soft. The description of this functional variation is known as the gradient architecture. The current challenge for manufacturing graded materials is to develop scalable processes that can easily control the continuous evolution of the gradient architecture within a structure in order to optimize structural performance. A power-law description of the gradient architecture for two-phase composite materials is conventionally used as follows the formula:

$$V = (x/t)p$$

where V is the volume fraction of one phase, x is the distance along the graded region (known as the interlayer), t is the thickness of the interlayer, and p is the gradient exponent. Values of p can range from 0 (all second phase in interlayer) to infinity (all first phase in interlayer).

A number of manufacturing technologies have been proposed for the processing of graded materials. They can be categorized as either transport-based or constructive processes. Constructive manufacturing processes that have been currently used to manufacture FGMs include: powder densification, coating, and lamination. Transport-based processes include: mass transport, thermal diffusion, centrifugal separation, and melt infiltration. While these techniques have been applied to metal and ceramic composites, there has not been as much research conducted on the manufacturing of graded materials using polymer composites.

One example of a current manufacturing technique for graded materials using polymer composites results in grading the distribution of SMA wires in polyurethanes using a lamination technique in order to control bending actuation for smart structure applications. A second example is using a technique for creating a continuously graded particle-reinforced polymer consisting of soda-lime glass microspheres in epoxy using a gravity casting technique to serve as a model material system for studying the failure of graded interfaces. However, both of these examples represent efforts to fabricate gradient architectures in polymer composites using laboratory-scale manufacturing techniques that are limited in the range of gradient architectures that can be produced for investigating the physics of graded materials. Thus, there is a need to demonstrate the production of continuous gradient architectures in polymer composites using industrial-scale manufacturing technologies that are capable of handling a variety of material systems and can produce a wider range of gradient architectures.

SUMMARY OF THE INVENTION

The invention proposed herein comprises a process to produce gradient materials, such as the fabrication of particle-reinforced polymers, with continuous gradient architectures using screw extrusion, and preferably twin screw extrusion (TSE), processing technology. Mixing models of the Residence Time Distribution (RTD) and Residence Volume Distribution (RVD) are used to characterize the TSE process. Convolution of these models with transient input conditions are then used to develop a new convolution process model for predicting the gradient architectures that evolve during the TSE process. In situ optical contrast measurements are used to characterize the evolution of the gradient architectures during the TSE process, while optical contrast, pycnometric density, and pyrolytic solids loading measurements are used to characterize the gradient architectures a posteriori to determine die effects on the evolution of the gradient architecture.

Accordingly, it is the object of this invention to provide an industrial scale process to produce gradient materials.

It is a further object of this invention to provide an industrial scale process to produce gradient propellant material.

This invention meets these and other objectives related to making gradient materials by providing a process comprising the steps of employing a screw extruder system having material input conditions, operating conditions, and hardware element configurations and introducing disturbances into at least one of the material input conditions, operating conditions, or hardware element configurations so that a gradient material is formed by the screw extruder system.

BRIEF DESCRIPTION OF THE DRAWINGS

The accompanying drawings, which are incorporated in and constitute a part of the specification, together with the description, serve to explain the principles of the invention.

FIG. 1 is a diagram showing standard elements of a TSE system.

FIG. 2 shows an embodiment of a screw configuration for a TSE system.

DESCRIPTION OF THE PREFERRED EMBODIMENT

In order to practice the present invention, a description of the quantitative relationships between the elements of a TSE system is provided below.

Quantitative residence time of TSE systems are a convenient measurement of the cumulative effect of all process and material parameters on the transport and mixing of materials in the TSE process. Therefore RTD, and its volumetric equivalent, RVD, have become common descriptors for the physics of the TSE process. These are typically expressed as normalized functions of time and volume in the following forms:

$$f(t) = \frac{c(t)}{\int_0^\infty |c(t)| dt}$$

$$g(v) = \frac{c\left(\frac{v}{Q}\right)}{\int_0^\infty \left|c\left(\frac{v}{Q}\right)\right| dv}$$

where $f(t)$ is the normalized RTD, $g(v)$ is the normalized RVD, Q is the throughput, t is time, v is volume, and c is a filtered probe response at time, t, or volume, v, associated with the impulse addition of a tracer material to the process. The RTD is often used to quantify various characteristics of the TSE process, such as the dampening that occurs as a result of backmixing in the extruder, while the RVD has been shown to provide a unique signature of the process independent of certain operating conditions. Based on the RTD and RVD characterization of the TSE process, mixing models of residence distributions have been developed for characterizing the TSE process.

To characterize the TSE process, residence distributions can be represented by the transport of material through a series of perfect mixers with a dead time. In the Laplace domain, the model of a single mixer with a dead time is given by, $$M(s) = \frac{c}{s+c}$$

Taking the Laplace inverse for the convolution of a series of mixers will yield a general $n^{th}$-order mixing model of the RTD or RVD given by:

$$f(x) = \frac{a_x^n}{(n-1)!}(x-x_d)^{n-1} e^{-a_x(x-x_d)}$$

where x can be the volume or time domain, and the parameters $x_d$ and $a_x$ are the delay volume or time and the shape factor respectively. While the mixing model is independent of the operating conditions, the exact order of the model still needs to be determined for a given TSE and screw configuration. TSEs that feature segmented elements have a very high number of possible configurations; it is this flexibility that offers the possibility of optimizing the gradient architecture.

The mean residence time, $t_m$, is related the shape factor, a, by the expression:

$$t_d = t_m - \frac{3}{a_i}$$

where the mean residence time satisfies the following relationship:

$$0.5 = \frac{\int_0^m |c(t)| dt}{\int_0^\infty |c(t)| dt}$$

It is also possible to relate parameters from the volume and time domains. The delay volume, $v_d$ is related to the delay time through the volumetric throughput, Q, as follows:

$$v_d = Qt_d$$

and the shape factor in the volume domain, $a_v$, is related to the shape factor in the time domain through the volumetric throughput in the following manner:

$$a_v = \frac{a_i}{Q}$$

By converting the residence distribution model from the time to the volume domain, it is possible to directly describe the output of a specific volume of material from the extruder. This will allow using the residence distribution model for predicting the spatial distributions of material in the gradient architecture for different operating conditions.

Having identified that the mixing models of residence distributions that can be used to characterize the TSE process, it is necessary to identify a method for using these models to predict the evolution of gradient architectures when the operating conditions are changed via disturbances in the process. In general, the output, y(t), from a linear, continuous, time-invariant system described by $\Phi(t)$ with input signal, u(t), can be predicted using the convolution integral:

$$y(t) = \int_0^t \Phi(t-\tau) u(\tau) d\tau$$

For the TSE process, this equation can also be transformed into the volume domain, with the output being the composition gradient, h(x), the input being the feed condition for the ingredients, and the behavior of the system described by the residence distribution function, $f(x)$. A general relationship between the convolution of the residence distribution function and the measured response function, can therefore be expressed as:

$$h(x) = \int_0^x g(x-x') u(x') dx'$$

where x can be either time, t, or volume, v. Because material is extruded through a die of constant cross-sectional area, the volume will also be directly related to the length of the extrudate.

To predict gradient architectures, it is of interest to understand the convolution using the previously discussed mixing models. For the $n^{th}$-order mixing model given above, the convoluted function, F(x), that represents the convolution process model is given as:

$$F(x) = \int_0^\infty \frac{a_x^n}{(n-1)!}(x-x_d)^{n-1} e^{-a_x(x-x_d)} H(x-x_d) u(x_d) dx$$

Letting u(x) also be the Heaviside step function, representing a step change to the feed input conditions, and solving the integral for a third order mixing model, this equation reduces to:

$$F(x) = \left[1 - \left(1 + a_x(x-x_d) + \frac{a_x^2(x-x_d)^2}{2}\right) e^{-a_x(x-x_d)}\right] H(x-x_d)$$

To understand the effects of introducing disturbances in the TSE process, for example changing feed rates of materials, on the evolution of the gradient architecture, it is also desirable to analyze the relationship between the feed conditions and gradient architecture independent of the residence distribution function. This analysis can then be used to identify the feed conditions necessary for determining the residence distribution function. For an impulse input, $u(x)=H(x)-H(x-\epsilon)$, where $\epsilon$ is a perturbation, the following response function is measured:

$$h(x) = \int_0^\infty g(x-x')[H(x') - H(x' - \varepsilon)]dx'$$

$$= \int_0^\infty g(x-x')dx' - \int_0^\infty g(x-x')H(x' - \varepsilon)dx'$$

$$= \int_0^\infty g(x-x')dx' - \int_\varepsilon^\infty g(x-x')H(x')dx'$$

$$= \int_0^\varepsilon g(x-x')dx'$$

For an impulse condition, the perturbation is assumed to be infinitesimal. Therefore, the following will describe the relationship between the residence distribution function and the measured response function:

$$h(x) \approx g(x)\epsilon$$

The normalized response, h(x), is therefore given by:

$$\bar{h}(x) = \frac{h(x)}{\int_0^\infty h(x')dx'} \approx \frac{g(x)\varepsilon}{\int_0^\infty g(x')\varepsilon dx'} = \frac{g(x)}{\int_0^\infty g(x')dx'}$$

which is identical to the definition of the normalized residence distribution function. Therefore, a normalized residence distribution function can be determined from a small perturbation to the input of the twin-screw extruder. However, it is important to note that if the perturbation is too small, it can not be detected, while a large perturbation will deviate significantly from the approximate relationship expressed in Equation and will require the use of the exact relationship expressed above.

For a unit step response, $u(x)=H(x)$, the following relationship is obtained:

$$h(x) = \int_0^\infty g(x-x')H(x')dx' = \int_0^\infty g(x-x')dx'$$

using the transform, $\bar{x}=x-x'$, this equation can be rewritten as:

$$h(x) = -\int_x^{x-8} g(\bar{x})d\bar{x}$$

$$= \int_{x-8}^x g(\bar{x})d\bar{x}$$

$$= \int_{-\infty}^x g(\bar{x})d\bar{x}$$

For the TSE process, $g(x)=0$ for $x<0$, yielding:

$$h(x) = \int_0^x g(\bar{x})d\bar{x}$$

Therefore, the gradient architecture that is attributed to a step change in the input to the extruder can be easily predicted by integrating the measured response from a perturbation to the input.

Having described the theoretical basis and models used to describe the TSE process in order to practice the present invention, a description of the present invention is now provided.

TSE processes are currently utilized to manufacture a number of commercial and military products consisting of polymers (medical tubing), polymer composites (propellants), and organic materials (snack foods). The process can continuously output material as long as the feed and operating conditions are maintained, making it ideally suited for the production of graded materials.

FIGS. 1 and 2 show the equipment and layout of a standard TSE system. The equipment utilized in the TSE process basically consists of an extruder 100, with two screws 102, typically fully intermeshing, formed from segmented elements on shafts that run through temperature-controlled modular barrels 104. Feeders 106 are attached to the barrels for accurately controlling the addition of liquid or solid ingredients to the process using loss-in-weight control for solids or flow metering for liquids. Additional control over the TSE processing of materials is obtained by choosing screw 102 elements with geometries, when in motion, vary the rate at which materials are conveyed, the type of shear mixing, and the amount of devolatilization. Proper configuration of screw elements can result in a degree of mixing in homogeneous materials that is better than batch methods are capable of producing when the extruder is operated in steady state. The final combined material is extruded through a die 108.

TSEs are normally operated in the steady state. The steady state is characterized by constant ingredient feeding rates and extruder 100 operating conditions, e.g., steady screw 102 speed and constant temperature control settings. Furthermore the steady state is characterized by steady or stationary material responses, such as, stable die pressure and temperature and constant extrudate velocity.

The invention, as embodied herein, comprises modifications to the TSE process that allow a user to fabricate graded materials, such as gradient polymer composites and gradient propellant materials. This is accomplished by varying the operating conditions and/or the addition of the ingredients in order to vary the material output from the TSE extruder. Formation of the gradient is initiated by introducing a disturbance or multiple disturbances into the process.

A disturbance into the process is herein defined as a change from steady state operation of the TSE system. There are several types of disturbances that may be introduced into the TSE system that allows a user to create a gradient material. In general the types of disturbances comprise material input conditions, operating conditions, and hardware element configurations of the TSE system. To practice the invention disturbances are introduced into at least one of the material input conditions, operating conditions, or hardware element configurations wherein a gradient material is formed by the screw extruder system.

The material input conditions of a TSE system that may be disturbed to practice the invention include such conditions as ingredient feeding rates changes of one or more of the ingredients being fed into the system to make the gradient material.

The operating conditions of a TSE system that may be disturbed to practice the invention include may be selected from the group of screw 102 speed, system temperature, system pressure, or a combination thereof. In a preferred embodiment of the invention, the screw 102 speed is disturbed.

While almost any type of disturbance may be employed to practice the invention when associated with material input conditions or operating conditions, it is preferred that the disturbances comprise single step disturbances, series of step disturbances, continuous linear ramp disturbances, or nonlinear ramp disturbances. In general, a linear ramp disturbance may be employed or a linear ramp disturbance may be approximated by stepped ramp disturbances to expand the range of gradient architectures that the TSE process can produce by extending the graded interlayer by an amount equal to the duration of the ramped disturbances and biasing the interlayer towards the initial input conditions.

However, it is also possible that the invention may be practiced by introducing a disturbance into the process that is a broken series of step changes. It is not necessary that the step sizes or any interval between steps be uniform in order to practice the invention.

In practicing the present invention, ramp disturbances are also considered as the eventual extinction of step size and interval disturbances. Ramp disturbances would have the effect of extending the gradient or optimizing the results of stepped disturbances. The ramps are possible using computerized control systems communicating digitally or analog with the device(s) being disturbed.

A final type of disturbance that may be applied to a TSE system to practice the invention is disturbing certain hardware element configurations of the TSE system. Preferred hardware element configurations that may be disturbed are selected from the group of a screw 102 geometry, die 108 geometry, ingredient feeding locations 106, or a combination thereof. Screws 102 comprise various combinations of individual elements that are positively and/or negatively pitched that result in specific conveying, mixing, dispersing, and pressurizing geometries. Changes in these geometries affect the residence distribution of materials within the process, and, therefore, are appropriate disturbances to create a gradient material. The internal shape of the die 108 and associated die adaptor can influence the radial architecture of the gradient of the material being processed. Finally, changes in the locations and/or order of the ingredients being introduced into the TSE system can also influence gradient creation.

In example 2 set forth below the set points of two solids feeders, that were introducing ammonium perchlorate at the same location along the extruder barrel, were changed. The gradients can be formed by any combination of one or more feeders feeding at one or more feeding locations. Also, changing the binder feeding rate and fixing the ammonium perchlorate feeding rates would have the effect of greatly extending the length of the gradient, because the binder has a significantly wider residence distribution.

In many materials, the processing conditions, such as agitator speed or temperature conditions, can affect material properties. Thus a gradient in those properties can be created. In some propellants, the extruder screw speed has a measurable effect on the burning rate. Therefore it is possible to introduce a gradient in rocket propellant by changing only the screw speed.

While the above description describes how one may practice the present invention in general, the following examples discuss specific embodiments of the invention described herein.

Example 1

Experimental studies were conducted to verify the convolution process model described above using a model polymer composite system for energetics applications consisting of an elastomer with KCl particle reinforcement that could be varied from 40 wt. % to 60 wt. % solids loading. In situ optical measurements were used to characterize the RTD and the gradient architectures that evolved from step changes in KCl particle reinforcement from approximately 50 wt. % KCl to 60 wt. % KCl. Shape factors determined from fitting various orders of mixing models to the RTD data for 0 to 60 wt. % KCl indicated that the response of the TSE process was insensitive to solids loading. While the RTD was predicted using a $2^{nd}$ order mixing model, the gradient architectures that evolved were predicted using the shape factors from the $2^{nd}$ order mixing models in a convolution with a $1^{st}$ order mixing model. In situ optical contrast measurements of the evolution of the gradient architecture were qualitatively similar to the predictions from the convolution process model using mixing models for the RTD, indicating that the convolution process model can be used to predict the evolution of gradient architectures in particle-reinforced polymers processed using TSE.

Example 2

Manufacturing of composite graded rocket propellant. Composite propellants are typically comprised of an energetic and/or oxidizing filler physically bound in an elastomeric polymer matrix.

This example consists of two grades of ammonium perchlorate for the filler. The first grade has a nominal particle size of 10 µm, referred to hereinafter as fine. The second grade has a nominal particle size of 90 µm, hereinafter referred to as coarse. A typical binder may be a polyacrylic elastomer that has been ground into feedable particles, roughly one eighth-inch irregular pellets, and coated with iron oxide and other solid ingredients that may be present in low concentrations. A combustion property of the propellant, the burning rate, is partly a function of the amount of filler and the relative amount of fine particles compared to the coarse fraction. To create a functionally graded composite propellant using the present invention with a desired solid geometry of 1.5 inches diameter and 30 inches in length (referred to as a single grain), the following steps may be followed. Furthermore for the example, add the requirement that the grain must be comprised of formulation A at one end and formulation B at the other with a smooth continuous gradient three inches in length in the center.

For example, Formulation A has 87 percent by weight ammonium perchlorate at a coarse/fine weight ratio of 80/20. Formulation B contains 79 percent by weight ammonium perchlorate with a coarse/fine weight ratio of 50/50.

A small-scale production rate is 30 pounds/hr for Formulation A, for example, with no change in extruder screw speed or temperature control settings. The residence distribution for the particular screw design and rpm has been characterized beforehand using the above described mathematical models, and therefore, the gradient location and profile has been predicted.

The twin screw extrusion operation is, for example, running in steady state extruding a strand of Formulation A. The coarse-particle ammonium perchlorate feeding rate is 20.88 lb/hr, the fine-particle ammonium perchlorate feeding rate is 5.22 lb/hr, and the binder feeding rate is 3.90 lb/hr. The grain is remotely cut at the die face—this creates the end of the grain consisting of 100 percent formulation A.

To ensure that the gradient is exactly centered in the 30 inch grain, the process is allowed to continue in the steady state producing Formulation A for 20 seconds, as an example, after the cut. After the hold time, the process is disturbed by a change in the ammonium perchlorate feeding rates (Formulation A is still extruding from the die). A computerized control system is used so that two ammonium perchlorate feeders are changed simultaneously. The new coarse-particle feeding rate is 7.33 lb/hr, the new fine-particle feeding rate is 7.33 lb/hr, and the binder feeding rate remains unchanged at 3.90 lb/hr. The feeding rate changes are made in one step (simulating a step disturbance to the system) and no other process settings are changed including binder feeding rate, extruder screw speed, and temperature control set points.

After the delay time or delay volume (based on the residence distributions) has passed, the disturbance is reaching the die. However the structure of the gradient is no longer a step from Formulation A to Formulation B but rather a smoothed and continuous change from 100 percent A to 100 percent B following the convoluted residence model for that particular extruder screw design.

After the gradient has cleared the die, the material extruding through the die consists of 100 percent Formulation B. Once the total length of the extrudate reaches 30 inches, the grain is cut remotely and the functionally graded rocket propellant is ready for the next stages of manufacture.

Following the general steps above, a grain with the reverse gradient can now be made, i.e., by allowing a certain length of Formulation B to extrude and then returning the ammonium perchlorate feeding rates to produce Formulation A. This continues until the required numbers of motors are made.

What is described are specific examples of many possible variations on the same invention and are not intended in a limiting sense. The claimed invention can be practiced using other variations not specifically described above.

What is claimed is:

1. A process for making a gradient material, comprising:
   employing a screw extruder system comprising material rate input conditions and operating conditions in conjunction with a given hardware element configuration, wherein the screw extruder system comprises a twin-screw extruder with segmented elements to influence a specific architecture of the gradient material;
   employing multiple feed streams of raw ingredients at variable, feed rates for compounding and extruding a final material in the twin-screw extruder;
   predicting a gradient architecture of the gradient material by utilizing one of time and volume residence distribution functions with a functional description of the disturbances;
   introducing disturbances into at least one of the multiple feed streams by altering at least one of the material rate input conditions and the operating conditions, in conjunction with the given hardware element configuration, wherein said introducing disturbances comprises said raw ingredients are extruded while a first set of operation parameters are selected that lead up to steady state conditions, which run at a hold time, upon which the process is disturbed to a second set of operation parameters for a specific period of time before a return to said first set of operation parameters, which results in the final material, and
   wherein the disturbances are selected from at least one of the group of step disturbances, linear ramp disturbances, and non-linear ramp disturbances to form a compositional gradient as part of the final material; and
   producing the final material comprising the compositional gradient in an architecture of the final material, wherein said final material is the gradient material, and wherein the final material comprises a structure of at least two homogeneous materials separated by a continuous compositional gradient.

2. The process of claim 1, wherein said at least one of the material rate input conditions is disturbed.

3. The process of claim 1, wherein said at least one of the material rate input conditions comprises at least one ingredient feeding rate.

4. The process of claim 1, wherein said at least one of said operating conditions is disturbed.

5. The process of claim 1, wherein said at least one of said operating conditions is selected from the group of a screw speed, system temperature, system pressure, or a combination thereof.

6. The process of claim 5, wherein said at least one operating condition comprises the screw speed.

7. The process of claim 1, wherein the hardware element configurations are selected from at least one of the group of a screw geometry, die geometry, and ingredient feeding locations.

* * * * *